(12) United States Patent
Wöppermann et al.

(10) Patent No.: US 11,496,021 B2
(45) Date of Patent: Nov. 8, 2022

(54) ELECTRIC MOTOR HAVING A ROTOR SHAFT AND A FIRST AND A SECOND BEARING

(71) Applicant: SEW-EURODRIVE GMBH & CO. KG, Bruchsal (DE)

(72) Inventors: Markus Wöppermann, Karlsbad (DE); Jens Schillinger, Rastatt (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 37 days.

(21) Appl. No.: 17/054,026

(22) PCT Filed: Apr. 24, 2019

(86) PCT No.: PCT/EP2019/025124
§ 371 (c)(1),
(2) Date: Nov. 9, 2020

(87) PCT Pub. No.: WO2019/214845
PCT Pub. Date: Nov. 14, 2019

(65) Prior Publication Data
US 2021/0218314 A1 Jul. 15, 2021

(30) Foreign Application Priority Data
May 8, 2018 (DE) .......................... 102018003698.8

(51) Int. Cl.
*H02K 7/08* (2006.01)
*F16C 23/06* (2006.01)
(Continued)

(52) U.S. Cl.
CPC ............. *H02K 7/083* (2013.01); *F16C 23/06* (2013.01); *F16C 35/073* (2013.01); *F16D 3/06* (2013.01); *H02K 7/003* (2013.01)

(58) Field of Classification Search
CPC ........ H02K 7/083; H02K 7/003; F16C 23/06; F16C 35/073; F16D 3/06
(Continued)

(56) References Cited

U.S. PATENT DOCUMENTS 9,157,507 B2 * 10/2015 Zimmermann ....... F16H 57/025
10,151,416 B2 * 12/2018 Taneya .................. F16L 55/027
2010/0029392 A1 2/2010 Mueller

FOREIGN PATENT DOCUMENTS

DE 10312941 A1 12/2004
DE 102011012632 A1 8/2012
(Continued)

OTHER PUBLICATIONS

International Search Report issued in International Application No. PCT/EP2019/025124, dated Jul. 25, 2019, pp. 1-4, English Translation.

*Primary Examiner* — Terrance L Kenerly
(74) *Attorney, Agent, or Firm* — Carter, DeLuca & Farrell LLP

(57) ABSTRACT

An electric motor includes a rotor shaft, a first bearing, and a second bearing. The rotor shaft includes a first rotor shaft part and a second rotor shaft part, the first rotor shaft part being rotatably mounted via the first bearing, and the second rotor shaft part being rotatably mounted via the second bearing. A bellows is connected at its first axial end region to the first rotor shaft part, e.g., by welding, and the bellows is connected at its second axial end region to the second rotor shaft part, e.g., by welding.

26 Claims, 4 Drawing Sheets

(51) Int. Cl.
  *F16C 35/073*  (2006.01)
  *F16D 3/06*  (2006.01)
  *H02K 7/00*  (2006.01)
(58) Field of Classification Search
  USPC .......................................................... 310/90
  See application file for complete search history.

(56) References Cited

FOREIGN PATENT DOCUMENTS

| | | | | |
|---|---|---|---|---|
| JP | S5937879 | A | 3/1984 | |
| JP | 2014031825 | * | 2/2014 | ............ Y02E 40/60 |
| WO | 96/16465 | A2 | 5/1996 | |
| WO | 2008/110186 | A1 | 9/2008 | |

* cited by examiner

ELECTRIC MOTOR HAVING A ROTOR SHAFT AND A FIRST AND A SECOND BEARING

FIELD OF THE INVENTION

The present invention relates to an electric motor having a rotor shaft and a first and a second bearing.

BACKGROUND INFORMATION

It is generally conventional for electric motors to have a rotor shaft.

German Patent Document No. 103 12 941 describes an assembly set for a type range of geared motors.

SUMMARY

Example embodiments of the present invention provide an electric motor in a manner that makes it insensitive to temperature.

According to example embodiments of the present invention, an electric motor includes a rotor shaft, a first bearing, and a second bearing. The rotor shaft includes a first rotor shaft part and a second rotor shaft part. The first rotor shaft part is rotatably mounted via the first bearing, and the second rotor shaft part is rotatably mounted via the second bearing. A bellows is connected at its first axial end region to the first rotor shaft part, e.g., by a welded connection, and the bellows is connected at its second axial end region to the second rotor shaft part, e.g., by a welded connection.

This has the advantage that the bellows is able to compensate for thermally induced, axially directed changes in length. Thus, both bearings may be arranged as fixed bearings, and devices, which are sensitive to axial expansions, may be placed axially outside the bearings on both sides. In particular, an angle sensor is able to be placed on the B-side and is protectable from interfering axial expansions with the aid of the fixed bearing. In the same manner, on the A-side, the second rotor shaft part may be provided with a helical gearing, which meshes with a tooth system, especially a helical gearing, of a toothing part of a gear unit driven by the motor. Position errors, in particular, angle position errors, on the output side of the gear unit are therefore avoidable.

According to example embodiments, a ring part is situated between the first and the second rotor shaft part. For example, the first or the second rotor shaft part has an annular groove circumferential in the circumferential direction in relation to the axis of rotation of the rotor shaft part, in which the ring part is at least partially accommodated and/or into which the ring part at least partially projects. This has the advantage that the two rotor shaft parts have a first point of support with the aid of the ring part, and the bellows specifies a second point of support which is axially set apart from the ring part. In addition, each one of the rotor shaft parts is fixed in place via a respective bearing so that further points of support are specified. Of importance in this context is that the bearings are axially set apart from the ring part and from the bellows, which is also set axially apart from the ring part. The bellows rigidly connects the two rotor shaft parts in the circumferential direction so that torque is transmitted. Using the mentioned elements, i.e., the first bearing, second bearing, ring part, and furthermore also the bellows, the entire rotor shaft is assembled in a stable manner and mounted as a whole via the two bearings.

According to example embodiments, the ring part is a sealing ring, in particular an O-ring, in particular made from rubber or a plastic material, especially polymer. This allows for an axial displacement of the two rotor shaft parts relative to each other while a point of support is defined nevertheless.

According to example embodiments, the axial region covered by the ring part is encompassed by the axial region covered by the second bearing. This has the advantage that greater stability of the rotor shaft is able to be achieved.

According to example embodiments, the bellows is situated axially between the first and the second bearing, the bellows in particular, being situated axially between the second rotor shaft part and the first bearing. This has the advantage that the bellows is able to compensate for a thermally induced axial change in length.

According to example embodiments, the bellows is supported on a step of the first rotor shaft part on the one side and on an end face of the second rotor shaft part on the other side. This offers the advantage that it is possible to center the shaft in that a displacement in the radial direction is provided prior to connecting the bellows by a welded connection.

According to example embodiments, the bellows touches the first rotor shaft part at a contact surface which has a single axial position and thus, in particular, extends in the circumferential direction and in the radial direction. This offers the advantage that a radial displacement of the first rotor shaft part is able to take place prior to producing the welded connection to the bellows, and the rotor shaft parts are therefore able to be centered relative to each other and be fixed in place by the subsequent welded connection.

According to example embodiments, the bellows touches the second rotor shaft part at a contact surface which has a single axial position and thus particularly extends in the circumferential direction and in the radial direction, in particular, such that during the production of the motor, the bellows is disposed so as to be radially displaceable before the bellows is connected to the second rotor shaft part by welding. This offers the advantage that a radial displacement of the second rotor shaft part is able to take place prior to producing the welded connection to the bellows and the rotor shaft parts are thus able to be centered relative to each other and be held in place by the subsequent welded connection.

According to example embodiments, the bellows is arranged as a ring element, and the ring opening has an inner diameter which is greater than the outer diameter of the first rotor shaft part in the axial region covered by the bellows, in particular, such that the bellows is situated in a radially displaceable manner during the production of the motor before the bellows is connected to the first rotor shaft part by welding. This offers the advantage that the first rotor shaft part is able to be passed through the bellows and introduced into a blind hole of the second rotor shaft part. In this manner, the bellows compensates in an axial relative displacement of the two rotor shaft parts and still allows for a torque transmission of the torque generated by the active part in an operative connection with the stator of the electric motor.

According to example embodiments, the first rotor shaft part is passed through the bellows, in particular, through the ring opening of the bellows. This has the advantage that the bellows rests against and is connected to a stepped wall of the first rotor shaft part, the first rotor shaft part projecting into the second rotor shaft part and thus resting against the second rotor shaft part via a ring part, with an axial clearance from the bellows.

According to example embodiments, the contact surface on the second rotor shaft part is an end face of the second rotor shaft part. This offers the advantage that the axially outermost end face is able to be used for the connection to the bellows. The axial clearance between the two connection regions, i.e., contact surfaces, of the bellows is thus able to be kept as small as possible so that the most rotationally stiff bellows can be used.

According to example embodiments, the contact surface on the first rotor shaft part is situated on a step of the first rotor shaft part. This has the advantage that the bellows is able to be welded to the stepped wall and the two rotor shaft parts are thus able to be coaxially aligned with each other prior to the welding.

According to example embodiments, an active part is accommodated by the first rotor shaft part, and the bellows is situated either axially between the active part disposed on the first rotor shaft part and the second bearing and/or the second rotor shaft part, or is situated axially between the active part disposed on the second rotor shaft part and the first bearing and/or the first rotor shaft part. For example, the active part is a short-circuit cage or a permanent magnet system. For example, the short-circuit cage is connected in a thermally conductive manner to the first rotor shaft part. The heat transfer resistance between the short-circuit cage and the first rotor shaft part may be smaller in its absolute amount than the heat transfer resistance between the first rotor shaft part and in the direction of the environment and/or the housing of the motor. This offers the advantage that the active part introduces torque generated by the operative connection to the stator into the first rotor shaft part.

According to example embodiments, the housing of the electric motor has a housing part which is connected to a first and a second flange part, the housing part being situated between the first and the second flange part. The first bearing is accommodated in the first housing part, and the second bearing is accommodated in the second housing part. This has the advantage that the two flange parts are able to be arranged as bearing flanges and therefore accommodate bearings, the two flange parts being axially set apart from each other with the aid of the housing part.

According to example embodiments, the electric motor has a gear unit, and the second rotor shaft part is provided with a helical gearing or is connected in a torsionally fixed manner to a helical geared toothing part. The helical gearing or the helical geared part meshes with a toothing part of the gear unit. This has the advantage that the helical geared parts are optimally aligned relative to each other with the aid of the second bearing arranged as a fixed bearing, and position errors on the output side of the gear unit are thus avoidable. This offers the advantage that position errors on the gear unit output side are able to be avoided.

According to example embodiments, the bellows is made from sheet metal. This is considered advantageous insofar as an uncomplicated production is possible.

According to example embodiments, a shaft sealing ring is situated on the side of the second bearing facing away from the first rotor shaft part. For example, the shaft sealing ring is accommodated in the first flange part and/or a sealing lip extends on the second rotor shaft part. This offers the advantage that no dirt enters the connection region between the two rotor shaft parts.

Further features and aspects of example embodiments of the present invention are described in greater detail below with reference to the appended Figures.

DETAILED DESCRIPTION

Figure 1:
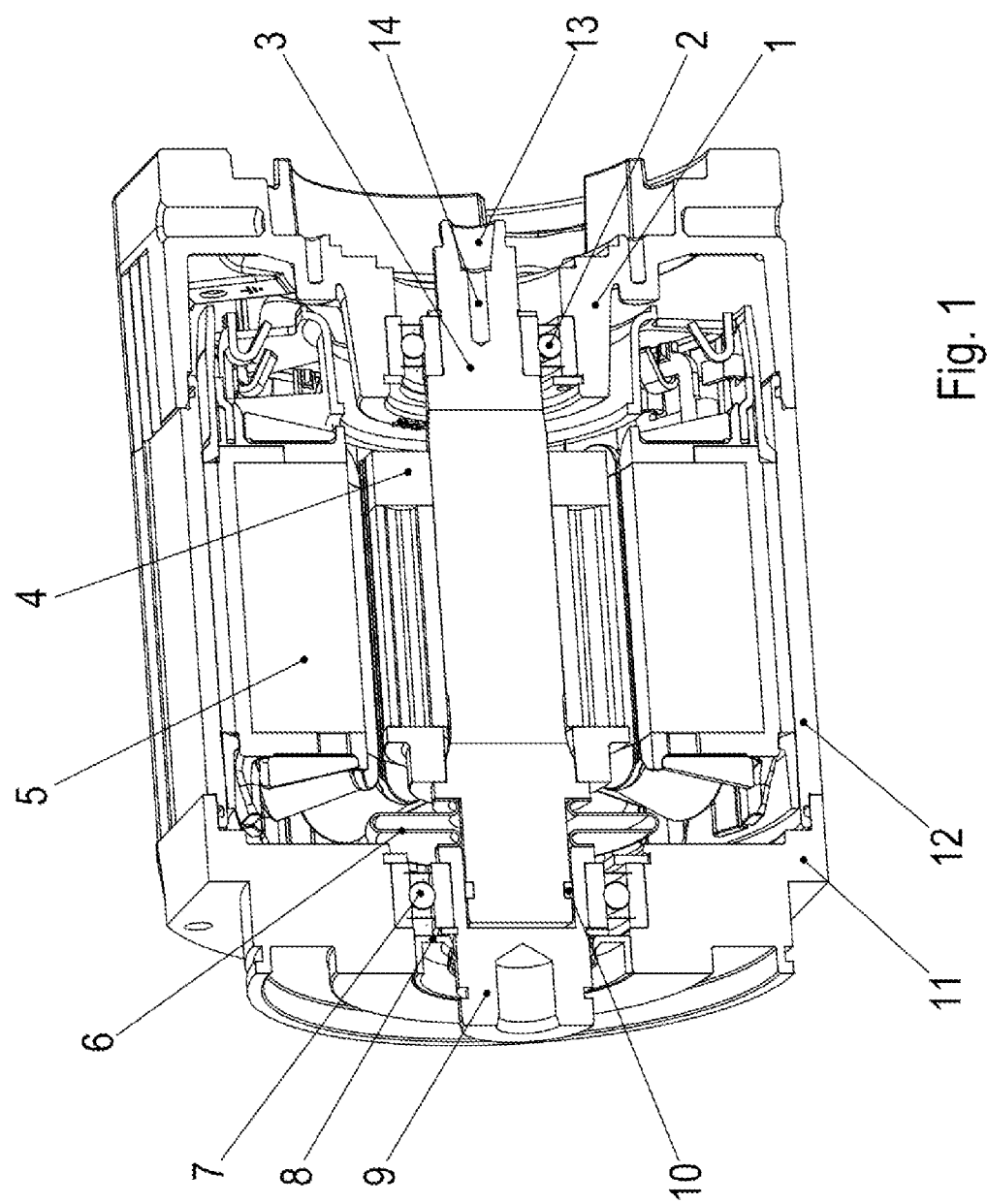
FIG. 1 is a perspective, partial cross-sectional view of an electric motor according to an example embodiment of the present invention.
Figure 2:
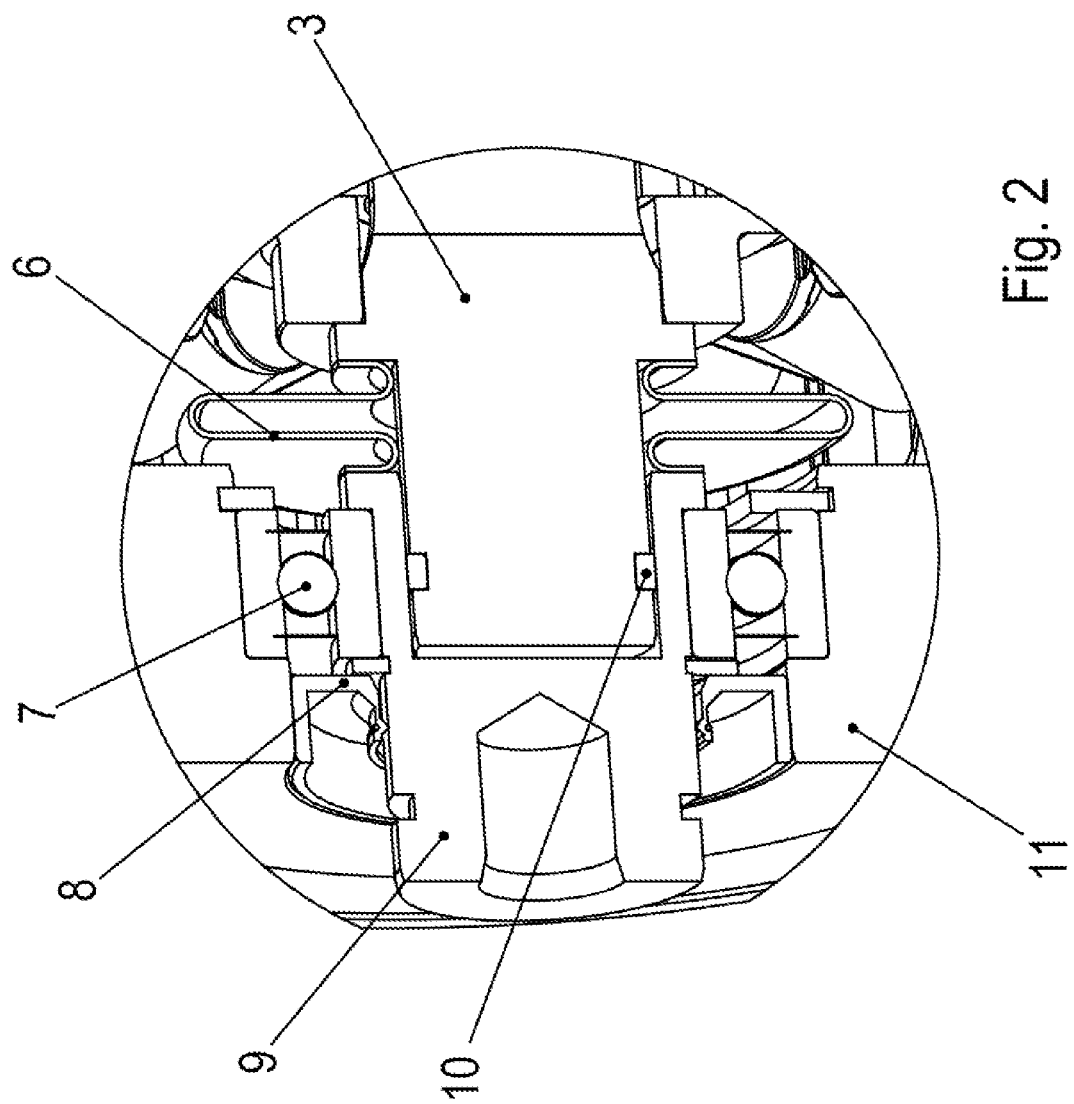
FIG. 2 is an enlarged view of a portion of FIG. 1.

As schematically illustrated in the Figures, an electric motor has a first flange part 1, in particular on its B-side, that is to say, on the side facing away from the load to be driven.

Flange part 1 is arranged as a bearing flange. A bearing 2, which mounts a first rotor shaft part 3, is accommodated in flange part 1. Bearing 2 is arranged as a fixed bearing and thus specifically not arranged as a floating bearing. As a result, bearing 2 is unable to compensate for thermally induced changes in length.

An angle sensor is disposed on the B-side. A sensor shaft of the angle sensor has a hollow configuration and is introduced into a recess situated in a centered manner in first rotor shaft part 3. The sensor shaft has an outer conical region which abuts an inner conical region 13 of first rotor shaft part 3. A precise centering of the shaft is therefore possible. A screw passed through the hollow shaft is screwed via its external thread into an internal thread 14 of first rotor shaft part 3, the screw head of the screw pressing the sensor shaft against first rotor shaft part 3.

First flange part 1 is connected to a housing part 12, which is connected to a second flange part 11. Housing part 12 is therefore axially interposed between the two flange parts (1, 11).

Second flange part 11 also accommodates a bearing 7, which is arranged as a fixed bearing.

A second rotor shaft part 9 is mounted with the aid of bearing 7.

Second rotor shaft part 9 has a centrally located recess, in particular, an axially directed blind hole, and first rotor shaft part 3 projects into the recess.

A sealing ring 10, in particular, an O-ring, which is situated in an annular groove of first rotor shaft part 3, seals in the direction of second rotor shaft part 9 and brings about the shaft-centrical alignment, that is to say, the coaxial alignment, of first rotor shaft part 3 with respect to second rotor shaft part 9.

Although first rotor shaft part 3 is mounted via first bearing 2, it also projects into the region covered by second bearing 7 in the axial direction, or in other words, in the direction of the axis of rotation of the rotor shaft part. This is because first rotor shaft part 3 is situated so as to project into a recess of second rotor shaft part 9, the second rotor shaft part 9 being mounted via second bearing 7. Overall, the rotor shaft of the electric motor thus has a bipartite configuration and supports active part 5. The bipartite configuration notwithstanding, improved stability is therefore achievable in the mounting as well.

In addition, first rotor shaft part 3 is connected to second rotor shaft part 9 with the aid of a bellows 6.

At its first axial end, bellows 6 is positioned against and is connected to first rotor shaft part 3, especially at a step of first rotor shaft part 3, in particular, by welding.

At its other axial end, bellows 6 is positioned against and is connected to the end face of second rotor shaft part 9, in particular, by welding.

The contact surface of bellows 6 with respect to first rotor shaft part 3 has only a single axial position. The contact surface thus extends only in the radial direction and in the circumferential direction in relation to the axis of rotation of the rotor shaft part. In this manner, the bellows is displaceable in the radial direction during the production and is therefore able to be centered relative to first rotor shaft part 3.

In the same manner, the contact surface of bellows 6 with respect to second rotor shaft part 9 extends in the radial direction and in the circumferential direction. The contact surface of bellows 6 with respect to second rotor shaft part 9 likewise has only a single axial position. In this manner, bellows 6 is displaceable in the radial direction during the production of the coupling and is therefore able to be centered relative to first rotor shaft part 3.

With the aid of bellows 6, thermally induced, axially directed changes in length are able to be compensated. For this purpose, first rotor shaft part 3 is positioned with clearance in the recess of second rotor shaft part 9.

The region covered by sealing ring 10 in the axial direction is encompassed by the region covered by bearing 7 of second rotor shaft part 9 in the axial direction.

An active part 5, in particular, a part having a short-circuit cage or permanent magnets, is situated axially between the two bearings 2 and 7.

Bellows 6 is, for example, produced from a sheet metal. The folds of bellows 6 are upsettable in the axial direction. Bellows 6 is, for example, produced as a rotating body and has a centrally located hole through which first rotor shaft part 3 projects.

Stator housing 12, which is arranged as a housing part, radially surrounds stator 5 of the electric motor.

Situated on the side of bearing 7 facing away from bellows 6 is a shaft sealing ring 8, which is accommodated by second flange part 11, flange part 11, in particular, having a bearing seat for bearing 7 in this regard. The sealing lip of shaft sealing ring 8 extends on second rotor shaft part 9, which has a finish-machined surface toward this end.

According to example embodiments of the present invention, thermally induced changes in length of first rotor shaft part 3 do not cause any falsifications in the sensing of the angular position of the first rotor shaft part with the aid of the angle sensor disposed on the electric motor. This is because bearing 2 of first rotor shaft part 3 facing the angle sensor is arranged as a fixed bearing.

In the same manner, however, a fixed bearing is provided on the load side. The bearing of second rotor shaft part 9 is thus provided as a fixed bearing.

In further exemplary embodiments, a coupling is provided between first rotor shaft part 3 and the sensor shaft so that torque jerks introduced into rotor shaft 3 and/or introduced transverse torque jerks are kept away from the sensor shaft or are transmitted to the sensor shaft only to a lesser degree.

Figure 3:
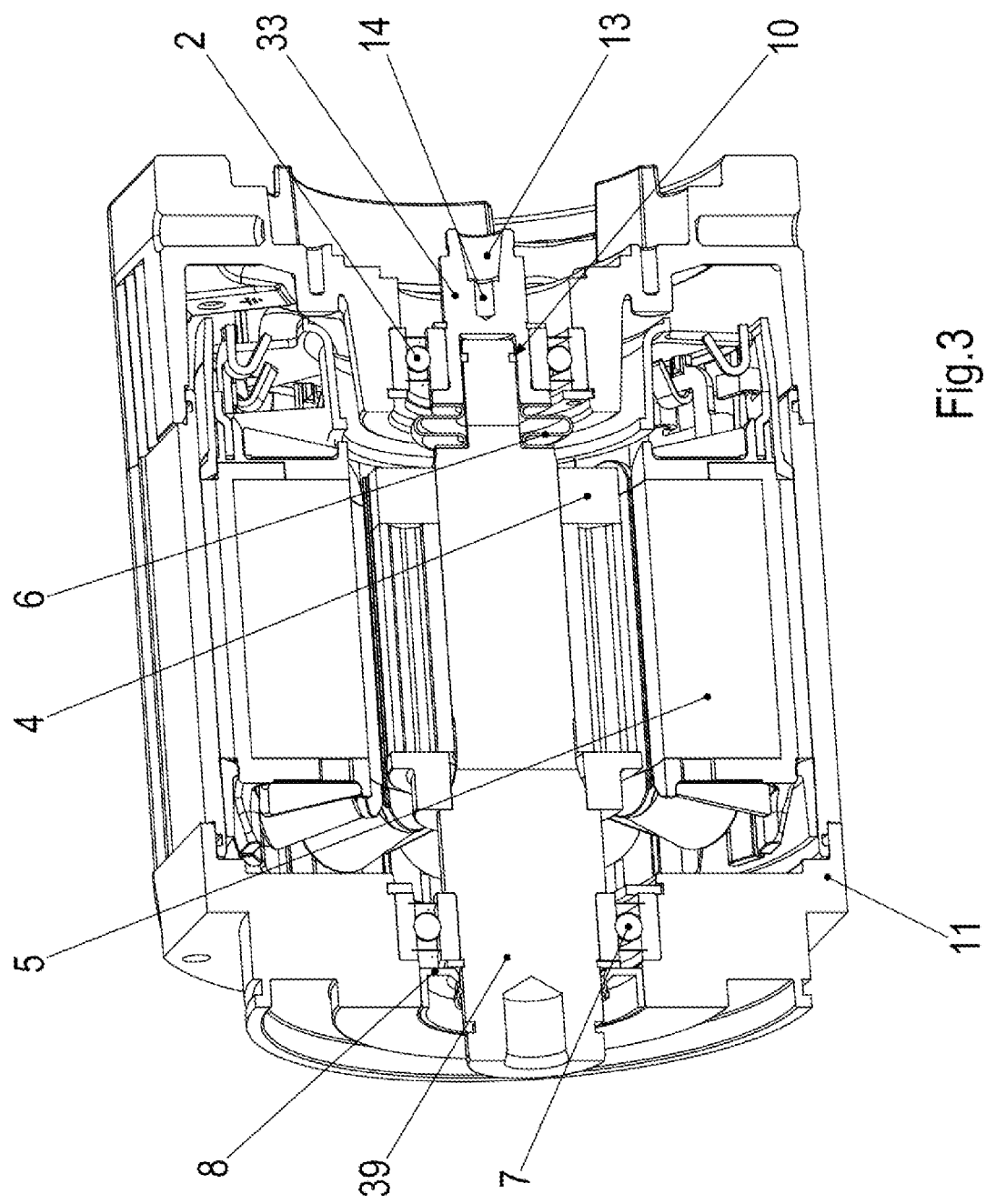
FIG. 3 schematically illustrates an electric motor according to an example embodiment of the present invention, in which a bellows 6 is situated in a different axial position, i.e., on the side of active part 4 of the motor that axially faces away from the load to be driven by the motor.
Figure 4:
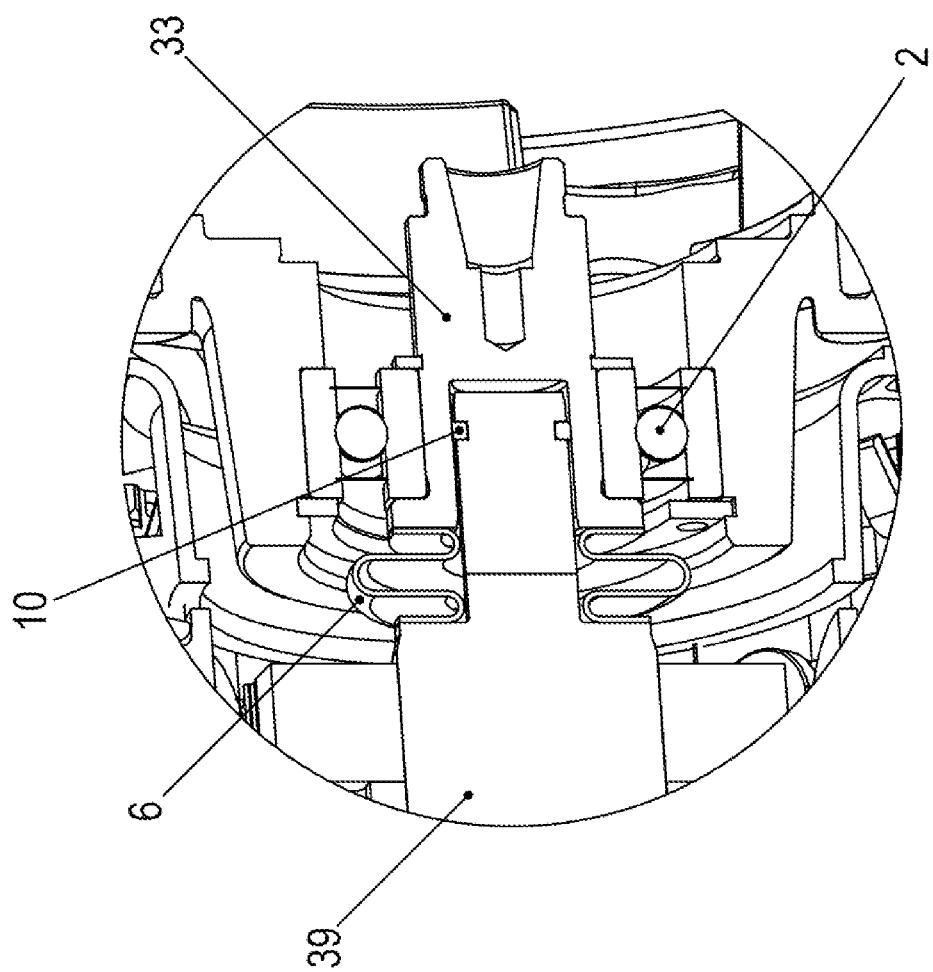
FIG. 4 is an enlarged view of a portion of FIG. 3.

As illustrated in FIGS. 3 and 4, bellows 10 is situated on the other side of active part 4 in further exemplary embodiments. Second rotor shaft part 39 thus has an axially greater length than in FIG. 1 and accommodates active part 4.

First rotor shaft part 33 is arranged correspondingly shorter.

As also illustrated in FIG. 1, bearing 2 of rotor shaft part 33 illustrated in FIG. 3 is situated at a smaller radial distance than bearing 7 of second rotor shaft part 39. This is because no substantial torque has to be transmitted on the B-side.

As illustrated in FIG. 3, the active part thus particularly introduces torque directly into second rotor shaft part 39 and the torque is output on the A-side, i.e., in the region of bearing 7, to the load to be driven.

Sealing ring 10 is situated in the axial region covered by bearing 2 illustrated in FIG. 3.

On the B-side, i.e., on first rotor shaft part 33, the sensor shaft of the angle sensor is connected to rotor shaft part 33, in particular, by a screwed connection.

Since torque is output on the A-side, this means that the loading of bellows 6 is low.

LIST OF REFERENCE NUMERALS 1 first flange part, B-side flange
2 bearing, in particular, a fixed bearing
3 first rotor shaft part
4 active part, in particular, a short-circuit cage
5 stator
6 bellows
7 bearing, in particular, a fixed bearing
8 shaft sealing ring
9 second rotor shaft part
10 sealing ring, in particular, an O-ring
11 second flange part, A-side flange
12 stator housing
13 inner conical region
14 internal thread
33 first rotor shaft part
39 second rotor shaft part

The invention claimed is:

1. An electric motor, comprising:
a rotor shaft including a first rotor shaft part and a second rotor shaft part;
a bellows having a first axial end region and a second axial end region;
a first bearing; and
a second bearing;
wherein the first rotor shaft part is rotatably mounted via the first bearing;
wherein the second rotor shaft part is rotatably mounted via the second bearing;
wherein the first axial end region of the bellows is connected and/or welded to the first rotor shaft part;
wherein the second axial end region of the bellows is connected and/or welded to the second rotor shaft part; and
wherein a region covered by the first rotor shaft part in an axial direction overlaps with a region covered by the second bearing in the axial direction.

2. The electric motor according to claim 1, wherein the first rotor shaft part is arranged as a single piece, and the second rotor shaft part is arranged as a single piece.

3. The electric motor according to claim 1, wherein the axial direction is aligned in parallel with an axis of rotation of the rotor shaft.

4. The electric motor according to claim 1, wherein the first rotor shaft part projects and/or is inserted into a recess of the second rotor shaft part.

5. The electric motor according to claim 1, wherein a ring part is arranged between the first rotor shaft part and the second rotor shaft part.

6. The electric motor according to claim 5, wherein the first rotor shaft part and/or the second rotor shaft part includes an annular groove circumferential in a circumferential direction in relation to an axis of rotation of the rotor shaft part, the ring part being at least partially accommodated in and/or projecting into the groove.

7. The electric motor according to claim 5, wherein the ring part includes a sealing ring and/or an axial region covered by the ring part is encompassed by an axial region covered by the first bearing and/or by the second bearing.

8. The electric motor according to claim 7, wherein the sealing ring includes an O-ring and/or is formed of rubber, a plastic material and/or a polymer.

9. The electric motor according to claim 1, wherein the bellows is arranged axially between the first bearing and the second bearing.

10. The electric motor according to claim 9, wherein the bellows is arranged axially between a step of the first rotor shaft part and the second bearing or the bellows is arranged axially between a step of the second rotor shaft part and the first bearing.

11. The electric motor according to claim 1, wherein the bellows is supported on a step of the first rotor shaft part on a first side and on an end face of the second rotor shaft part on a second side.

12. The electric motor according to claim 1, wherein the bellows is supported on a step of the second rotor shaft part on a first side and on an end face of the first rotor shaft part on a second side.

13. The electric motor according to claim 1, wherein (a) the bellows touches the first rotor shaft part at a contact surface having a single axial position and extends in a circumferential direction and in a radial direction and/or (b) the bellows touches the second rotor shaft part at a contact surface having a single axial position and extends in the circumferential direction and in the radial direction.

14. The electric motor according to claim 13, wherein the contact surface on the second rotor shaft part includes an end face of the second rotor shaft part and/or the contact surface on the first rotor shaft part includes an end face of the first rotor shaft part.

15. The electric motor according to claim 13, wherein the contact surface on the first rotor shaft part is arranged on a step of the first rotor shaft part.

16. The electric motor according to claim 13, wherein during production of the electric motor, the bellows is disposed in a radially displaceable manner before the bellows is connected to the second rotor shaft part by welding.

17. The electric motor according to claim 1, wherein the bellows is arranged as a ring part, and a ring opening has an inner diameter that is greater than an outer diameter of the first rotor shaft part in an axial region covered by the bellows.

18. The electric motor according to claim 17, wherein the bellows is arranged in a radially displaceable manner during production of the motor before the bellows is connected to the first rotor shaft part by welding.

19. The electric motor according to claim 1, wherein the first shaft part and/or the second rotor shaft part extends through the bellows and/or through a ring opening of the bellows.

20. The electric motor according to claim 1, wherein an active part is accommodated by the first rotor shaft part, and the bellows is (a) arranged either axially between the active part disposed on the first rotor shaft part and the second bearing and/or the second rotor shaft part or (b) arranged axially between the active part disposed on the second rotor shaft part and the first bearing and/or the first rotor shaft part, the active part including a short-circuit cage connected in a thermally conductive manner to the first rotor shaft part and/or a permanent magnet system, a heat transfer resistance between the short-circuit cage and the first rotor shaft part being smaller in absolute amount than a heat transfer resistance between the first rotor shaft part and a direction of the environment and/or a housing of the motor.

21. The electric motor according to claim 1, wherein a housing of the electric motor has a housing part connected to a first flange part and a second flange part, the housing part being arranged between the first flange part and the second flange part and touching both the first flange part and the second flange part, the first bearing being accommodated in a first housing part, the second bearing being accommodated in a second housing part.

22. The electric motor according to claim 21, wherein the first bearing includes a rolling bearing and/or a ball bearing, and the second bearing includes a rolling bearing and/or a ball bearing.

23. The electric motor according to claim 1, wherein the housing part is arranged as a stator housing.

24. The electric motor according to claim 1, wherein the bellows is made from sheet metal.

25. The electric motor according to claim 1, wherein a shaft sealing ring is arranged on a side of the second bearing facing away from the first rotor shaft part and/or is accommodated in the first flange part and/or a sealing lip extends on the second rotor shaft part.

26. An electric motor, comprising:
a rotor shaft including a first rotor shaft part and a second rotor shaft part;
a bellows having a first axial end region and a second axial end region;
a first bearing; and
a second bearing;
wherein the first rotor shaft part is rotatably mounted via the first bearing;
wherein the second rotor shaft part is rotatably mounted via the second bearing;
wherein the first axial end region of the bellows is connected and/or welded to the first rotor shaft part;
wherein the second axial end region of the bellows is connected and/or welded to the second rotor shaft part; and
wherein the electric motor includes a gear unit, and the second rotor shaft part includes a helical gearing and/or is connected in a torsionally fixed manner to a helical toothing part, the helical gearing and/or the helical geared part meshing with a toothing part of the gear unit.

* * * * *